United States Patent
Kunikata

(10) Patent No.: US 7,451,844 B2
(45) Date of Patent: Nov. 18, 2008

(54) FRONT END STRUCTURE OF VEHICLE

(75) Inventor: Yuhei Kunikata, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/523,594

(22) Filed: Sep. 20, 2006

(65) Prior Publication Data

US 2007/0068716 A1    Mar. 29, 2007

(30) Foreign Application Priority Data

Sep. 29, 2005    (JP)  ............................. 2005-283829

(51) Int. Cl.
*B60K 11/00*    (2006.01)
*B60K 13/02*    (2006.01)

(52) U.S. Cl. .................. 180/68.1; 180/68.2; 180/68.3

(58) Field of Classification Search ............... 180/68.1, 180/68.6, 69.22, 68.2, 68.3; 123/41.05, 198 E, 123/41.15, 41.48, 41.56
See application file for complete search history.

(56) References Cited

U.S. PATENT DOCUMENTS

| | | | | | |
|---|---|---|---|---|---|
| 2,913,065 | A | * | 11/1959 | Lyon, Jr. .................... | 180/68.1 |
| 3,205,964 | A | * | 9/1965 | Henry-Biabaud .......... | 180/68.1 |
| 4,114,714 | A | * | 9/1978 | Fachbach et al. .......... | 180/68.1 |
| 4,590,889 | A | * | 5/1986 | Hiereth ..................... | 123/41.05 |
| 4,706,615 | A | * | 11/1987 | Scadding ................ | 123/198 E |
| 4,748,943 | A | * | 6/1988 | Mayer ..................... | 123/41.15 |
| 4,938,303 | A | * | 7/1990 | Schaal et al. ............... | 180/68.1 |
| 4,995,447 | A | * | 2/1991 | Weidmann et al. ......... | 180/68.1 |
| 5,046,554 | A | * | 9/1991 | Iwasaki et al. ........... | 123/41.49 |
| 5,269,264 | A | * | 12/1993 | Weinhold ................ | 123/41.05 |
| 5,551,505 | A | * | 9/1996 | Freeland ..................... | 180/68.1 |
| 2005/0029027 | A1 | * | 2/2005 | Kunikata et al. ........... | 180/68.1 |

FOREIGN PATENT DOCUMENTS

| | | |
|---|---|---|
| DE | 30 10 495 C2 | 9/1981 |
| DE | 36 00 190 A1 | 7/1986 |
| DE | 44 01 643 C2 | 8/1994 |

* cited by examiner

*Primary Examiner*—Hau V Phan
(74) *Attorney, Agent, or Firm*—Oliff & Berridge, PLC

(57) ABSTRACT

A front end structure of a vehicle surrounding heat exchangers with ducts to thereby improve the heat exchangers in cooling ability, that is, a front end structure of a vehicle provided with heat exchangers positioned in an engine compartment in which an engine is mounted and exchanging heat between air and a heat medium, wherein the heat exchangers are surrounded by duct members sticking out to the vehicle front side, preventing hot air in the engine compartment from reaching the front end sides of the heat exchangers, and guiding air present at the vehicle front side to the heat exchangers and wherein among the duct members, a bottom duct positioned at the vehicle bottom side is formed with first through holes running through the vehicle in the up-down direction.

4 Claims, 3 Drawing Sheets

FRONT END STRUCTURE OF VEHICLE

BACKGROUND OF THE INVENTION

1. Field of the Invention

The present invention relates to the front end structure of a vehicle forming the front end of the chassis of the vehicle.

2. Description of the Related Art

The radiator, condenser, and heat exchangers mounted in a vehicle use air introduced from the vehicle front end side to cool cooling water, a refrigerant, or other fluid, but there is the problem that when the vehicle is at rest or when the vehicle speed is low, the hot air in the engine compartment heated by the engine ends up reaching the front end sides of the heat exchangers (vehicle) causing the heat exchangers to fall in cooling ability.

To deal with this problem, the method has been proposed of surrounding the heat exchangers (at the top, bottom, left, and right) with ducts sticking out to the vehicle front side so as to prevent hot air from reaching the heat exchangers. Due to this, when the vehicle speed is high, the running air is effectively given to the front surfaces of the heat exchangers, so the amount of air running through the heat exchangers can also be increased.

However, if completely surrounding the heat exchangers with ducts like with the above method, the air passage becomes narrower, so the air resistance increases. Therefore, the problem arises that when the vehicle is at rest and when the vehicle speed is low, the cooling air running through the heat exchanger is decreased causing the heat exchangers to drop in cooling ability.

SUMMARY OF THE INVENTION

An object of the present invention, in consideration of the above point, is to provide a front end structure of a vehicle surrounding heat exchangers with ducts so as to improve the cooling ability of the heat exchangers.

To achieve the above object, the present invention provides a front end structure of a vehicle provided with heat exchangers (1, 2) positioned in an engine compartment (6a) in which an engine (6) is mounted and exchanging heat between air and a heat medium, wherein the heat exchangers (1, 2) are surrounded by duct members (12 to 14) sticking out to the vehicle front side, preventing hot air in the engine compartment (6a) from reaching the front end sides of the heat exchangers (1, 2), and guiding air present at the vehicle front side to the heat exchangers (1, 2) and wherein among the duct members (12 to 14), a bottom duct (13) positioned at the vehicle bottom side is formed with first through holes (13a) running through the vehicle in the up-down direction.

Due to this, when the vehicle is at rest and when being driven at a low speed, the air resistance can be reduced, so the cooling air running through the heat exchangers (1, 2) can be increased and the heat exchangers (1, 2) can be improved in cooling ability. Further, when there is no cover (9) at the vehicle bottom side, when driven at a high speed, fresh air flows in through the first through holes (13a), so the cooling air running through the heat exchangers (1, 2) can be increased and the heat exchangers (1, 2) can be improved in cooling ability. Therefore, in the entire vehicle speed region, the heat exchangers (1, 2) can be improved in cooling ability.

Preferably, the structure is provided with a cover (9) covering the vehicle bottom side of the engine compartment (6a), and second through holes (9a) are formed at positions of the cover (9) corresponding to the first through holes (13a).

Due to this, even when the vehicle bottom side is provided with a cover (9), effects similar to those of the above can be obtained.

More preferably, the present invention is provided with a closed surrounding member (15) connecting the first through holes (13a) and the second through holes (9a) between the bottom duct (13) and the cover (9).

Due to this, hot air can be prevented from reaching to the front end sides of the heat exchangers (1, 2), so the heat exchangers (1, 2) can be further improved in cooling ability. Further, preferably, the first through holes (13a) are arranged at the vehicle rear side of the reinforced bumper (7). Due to this, the passage for inflow of fresh air can be secured. Incidentally, the reference numerals in parentheses after the above means are examples showing the correspondence with the specific means described in the later explained embodiment.

BRIEF DESCRIPTION OF THE DRAWINGS

The present invention may be more fully understood from the description of the preferred embodiments of the invention set forth below together with the accompanying drawings, in which.

BEST MODE FOR WORKING THE INVENTION

First Embodiment

Figure 1:
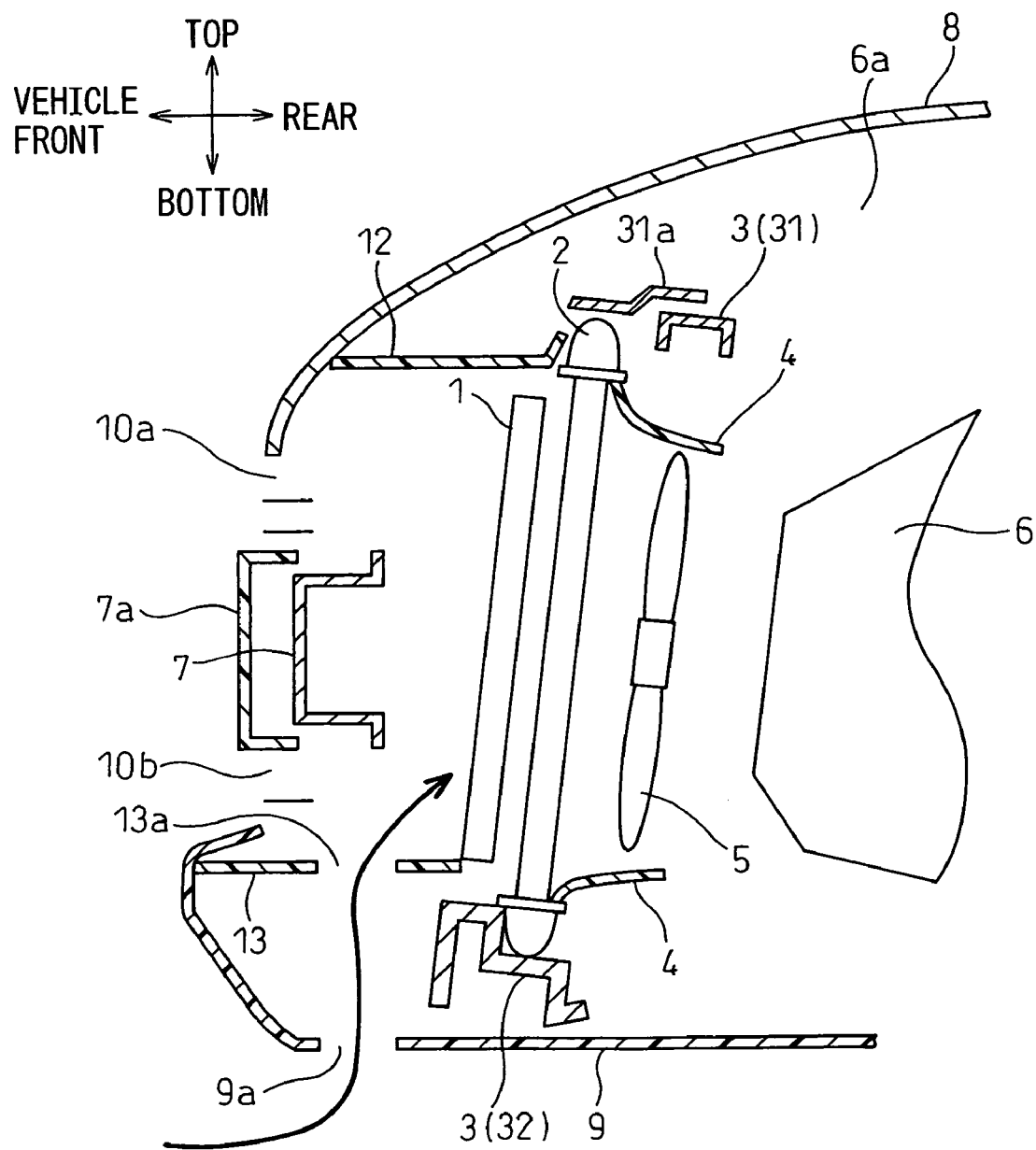
FIG. 1 is a cross-sectional view of a front end structure of a vehicle according to a first embodiment of the present invention.

Below, a first embodiment of the present invention will be explained with reference to FIG. 1 and FIG. 2. FIG. 1 is a cross-sectional view of a front end structure of a vehicle according to the first embodiment.

As shown in FIG. 1, a condenser 1 and a radiator 2 of the first embodiment are mounted at a chassis through a common carrier 3. The condenser 1 is placed at the upstream-most part of the carrier 3 (frontmost part), while the radiator 2 is placed at the downstream side of the condenser 1. Further, a blower 5 is provided at the downstream side of the radiator 2. Note that the condenser 1 and the radiator 2 will also be referred to together as "the heat exchangers 1, 2".

The condenser 1 is a heat exchanger exchanging heat between a refrigerant circulating through a refrigeration cycle (not shown) and the outside air so as to cool the refrigerant. Further, the radiator 2 is a heat exchanger exchanging heat between engine cooling water and outside air to cool the engine cooling water. Note that the refrigerant and engine cooling water correspond to the "heat medium" of the present invention.

Further, in FIG. 1, illustration of the specific configurations of the condenser 1 and radiator 2 will be omitted, but each of the condenser 1 and radiator 2, as is well known, is provided with a heat exchange core part comprised of a combination of flat tubes and corrugated fins and tank parts performing the function of distributing and collecting refrigerant or cooling water to and from the flat tubes of the heat exchange core part.

The tank parts of the condenser 1 are usually provided at the left and right sides of the heat exchange core part. As opposed to this, the tank parts of the radiator 2 are provided at the top and bottom sides or the left and right sides of the heat exchange core part in accordance with the available installation space.

The carrier 3 has the heat exchangers 1, 2 etc. mounted and fixed on it, so is also referred to in some publications as the "front end panel" or "radiator support". Further, the carrier 3 has a top beam member 31 positioned at the top side and extending in the horizontal direction, a bottom beam member 32 positioned at the bottom side and extending in the horizontal direction, and two beam members 31, 32 extending in the up-down direction connected by support columns 33a, 33b. The top beam member 31 has a bracket 31a extending to the vehicle front side. The heat exchangers 1, 2 are attached to the vehicle bottom side of this bracket 31a.

The radiator 2 is provided at the vehicle rear side with a plastic fan surround member 4. The fan surround member 4 has the function of closing the clearance between the blower 5 blowing air to the heat exchangers 1, 2 and the radiator 1 and preventing the air flow induced by the blower 5 from bypassing the heat exchangers and the function of supporting the blower 5.

Further, in the first embodiment, the heat exchangers 1, 2 are mounted at the vehicle rear side of the reinforced bumper 7 at the front end of the vehicle, in other words, at the front end of the engine compartment 6a in which the engine 6 is mounted.

Here, the reinforced bumper 7 is a beam shaped member extending in the vehicle width direction at the front end of the vehicle and absorbing impact from the vehicle front end side. The left and right ends of the reinforced bumper 7 in the vehicle width direction are connected through stress absorbers (not shown) to side members of the chassis (not shown). These stress absorbers are generally called "crash boxes" and are members which can easily deform upon impact.

This reinforced bumper 7 is provided at its front end side with a plastic decorative part constituting a bumper cover 7a. This bumper cover 7a covers the reinforced bumper 7 at its front end side.

The top opening of the engine compartment 6a in which the engine 6, the heat exchangers 1, 2, etc. are mounted is covered by a lid member constituting an engine hood 8. Further, the engine compartment 6a is substantially closed off at its bottom side by a cover 9.

Above and below the reinforced bumper 7, vehicle front openings 10a, 10b are provided. The top first vehicle front opening 10a and bottom second vehicle opening 10b are for introducing cooling air to the heat exchangers 1, 2.

Figure 2:
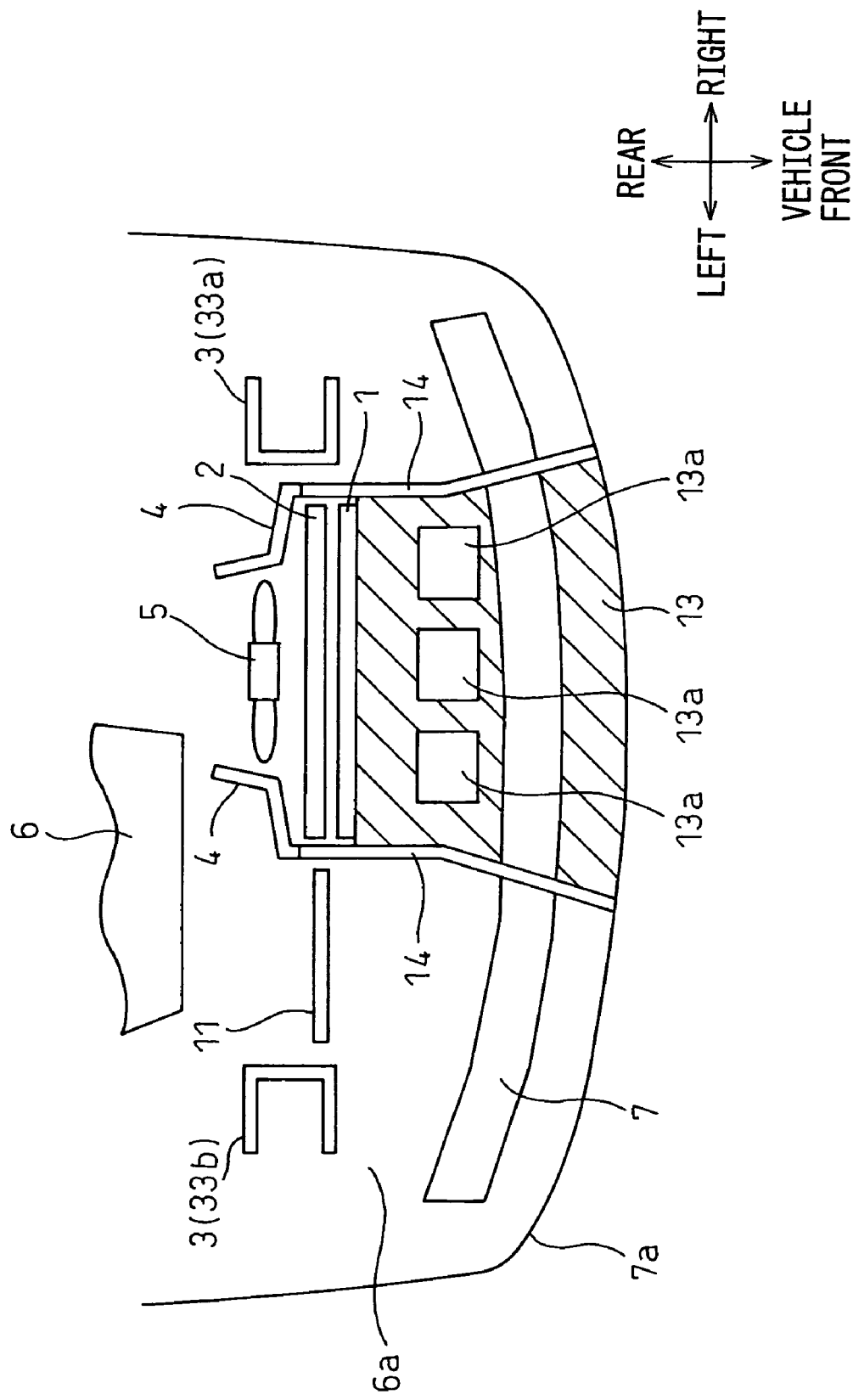
FIG. 2 is a plan view of the inside of an engine compartment of the front end structure of a vehicle according to the first embodiment as seen from the vehicle top side.

FIG. 2 is a plan view showing the state in the engine compartment 6a in a front end structure of a vehicle according to the first embodiment as seen from the vehicle top side. As shown in FIG. 2, the heat exchangers 1, 2, fan surround member 4, and blower 5 are arranged closer toward one of the two support columns 33a, 33b of the carrier 3 (in the first embodiment, the support column 33a at the right side in FIG. 2). Further, a partition 11 is provided between the other support column 33b and fan surround member 4. This partition 11 is designed to prevent hot air near the engine 6 from reaching the front sides of the heat exchangers 1, 2 and preventing fresh air present at the vehicle front side (air in which hot air is not mixed) from flowing to the vehicle rear side without passing through the heat exchangers 1, 2.

As shown in FIG. 1 and FIG. 2, the heat exchangers 1, 2 are provided at their vehicle top sides, bottom sides, and left and right sides with a top duct 12, bottom duct 13, and side ducts 14 sticking out to the vehicle front side. These ducts 12 to 14 are designed to prevent hot air of the engine compartment 6a from passing between the clearances of the carrier 3 and chassis and reaching the front end sides of the heat exchangers 1, 2 and to guide the fresh air present at the vehicle front side to the heat exchangers 1, 2. Note that top duct 12, bottom duct 13, and side ducts 14 correspond to the "duct members" of the present invention.

The bottom duct 13 is formed with a plurality of first through holes 13a running in the vehicle up-down direction. Further, locations of the cover 9 corresponding to the first through holes 13a are formed with second through holes 9a running in the vehicle up-down direction. Through these through holes 13a, 9a, air can be introduced from the vehicle bottom side to the front end sides of the heat exchangers 1, 2.

As explained above, by providing the bottom duct 13 and cover 9 with the through holes 13a, 9a, when the vehicle is at rest and when being driven at a low speed where mainly the negative pressure of the blower 5 is used to supply the heat exchangers 1, 2 with cooling air, the air resistance can be reduced. For this reason, the cooling air running through the heat exchangers 1, 2 can be increased and the heat exchangers 1, 2 can be improved in cooling ability. Further, at the time of high speed driving when mainly the running air is used to supply the heat exchangers 1, 2 with cooling air, the fresh air passing through the through holes 13a, 9a can be made to flow to the front end sides of the heat exchangers 1, 2. For this reason, the cooling air running through the heat exchangers 1, 2 can be increased and the heat exchangers 1, 2 can be improved in cooling ability. Therefore, in the entire vehicle speed range, the heat exchangers 1, 2 can be improved in cooling ability. Note that, as shown in FIG. 2, the through holes 13a are provided at the vehicle rear side of the reinforced bumper 7. Due to this, the passage for inflow of fresh air can be secured.

Second Embodiment

Figure 3:
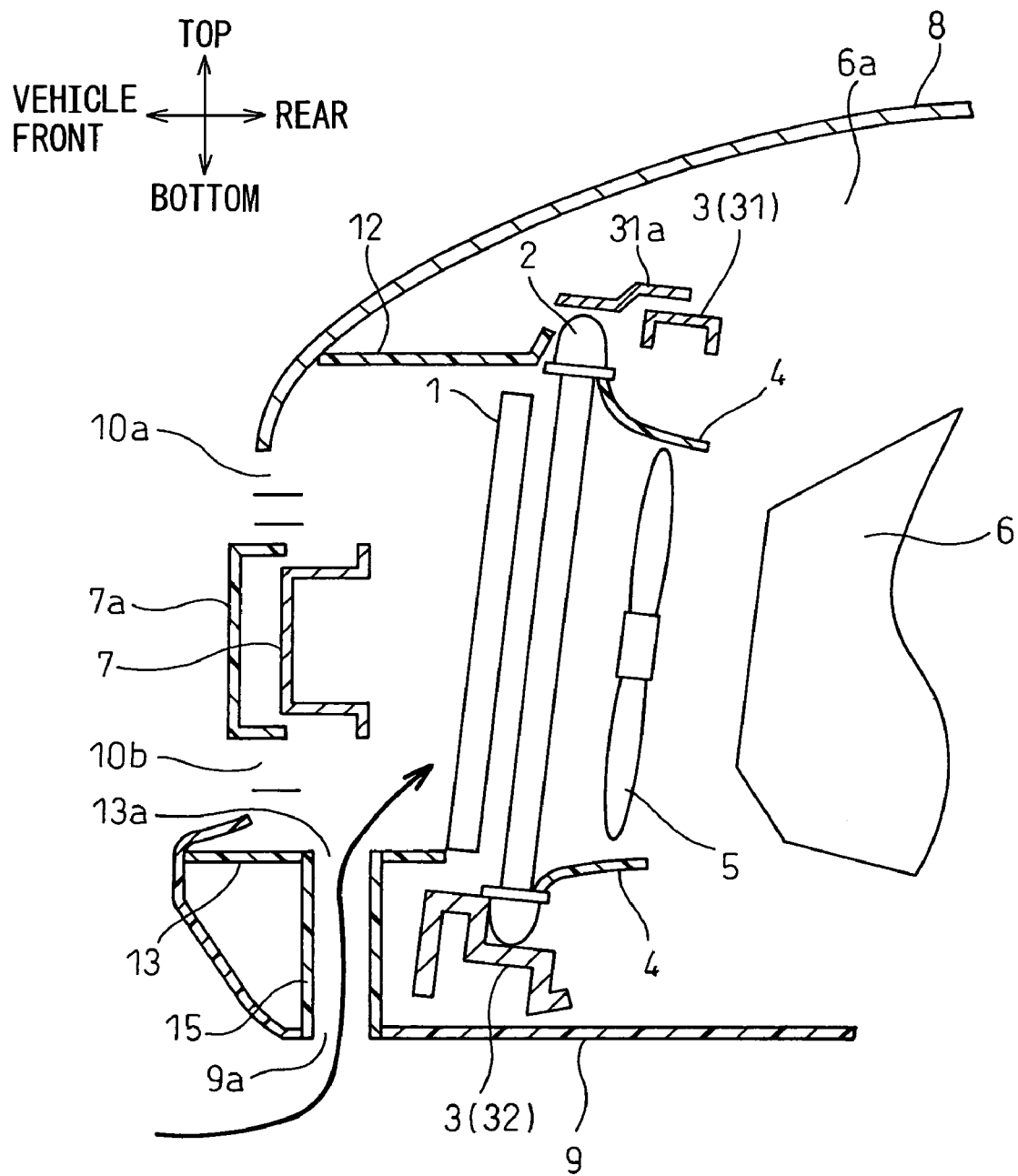
FIG. 3 is a cross-sectional view of the front end structure of a vehicle according to a second embodiment of the present invention.

Next, a second embodiment of the present invention will be explained based on FIG. 3. Parts the same as in the above first embodiment are assigned the same reference numerals and explanations therefore are omitted. FIG. 3 is a cross-sectional view of the front end structure of a vehicle according to the second embodiment.

In the configuration of the above first embodiment, when the vehicle is at rest and when being driven at a low speed, hot air in the engine compartment 6a was liable to pass between the clearance of the bottom side beam member 32 of the carrier 3 and the cover 9 to reach the front end sides of the heat exchangers 1, 2 and thereby cause the heat exchangers 1, 2 to drop in cooling ability.

As opposed to this, in the second embodiment, as shown in FIG. 3, a closed surrounding member 15 connecting the first through holes 13a and the corresponding second through holes 9a is provided between the bottom duct 13 and the cover 9. One opening of the closed surrounding member 15 is connected to the first through holes 13a, while the other opening is connected to the second through holes 9a. Further, the passage formed by the closed surrounding member 15 runs in the vehicle up-down direction.

Due to this, hot air can be prevented from reaching the front end sides of the heat exchangers 1, 2. Further, the air passing through the second through holes 9a can be prevented from escaping to the vehicle rear side etc. and can be made to completely flow to the front sides of the heat exchangers 1, 2. Therefore, the heat exchangers 1, 2 can be more improved in cooling ability.

Other Embodiments

Note that in the above first embodiment, the cover 9 was provided, but the present invention can also be applied to vehicles not provided with covers.

While the invention has been described by reference to specific embodiments chosen for the purposes of illustration, it should be apparent that numerous modifications could be made thereto by those skilled in the art without departing from the basic concept and scope of the invention.

The invention claimed is:

1. A front end structure of a vehicle provided with heat exchangers positioned in an engine compartment in which an engine is mounted and exchanging heat between air and a heat medium, wherein
   the heat exchangers are surrounded by duct members sticking out toward the vehicle front side from the heat exchangers, preventing hot air in the engine compartment from reaching the front end sides of the heat exchangers, and guiding air present at the vehicle front side to the heat exchangers and wherein
   among the duct members, a bottom duct positioned at the vehicle bottom side is formed with first through holes at the vehicle front side from the heat exchangers, the first through holes running through the vehicle in the up-down direction.

2. A front end structure of a vehicle as set forth in claim 1, wherein
   the structure is provided with a cover covering the vehicle bottom side of the engine compartment and
   second through holes are formed at positions of the cover corresponding to the first through holes.

3. A front end structure of a vehicle as set forth in claim 2, further provided with a closed surrounding member connecting the first through holes and the second through holes between the bottom duct and the cover.

4. A front end structure of a vehicle as set forth in claim 1, wherein said first through holes are provided at a vehicle rear side of a reinforced bumper.

* * * * *